US011180106B2

(12) United States Patent
Kanegae et al.

(10) Patent No.: US 11,180,106 B2
(45) Date of Patent: Nov. 23, 2021

(54) OCCUPANT PROTECTION DEVICE

(71) Applicant: SUBARU CORPORATION, Tokyo (JP)

(72) Inventors: Shota Kanegae, Tokyo (JP); Toru Yamashita, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 0 days.

(21) Appl. No.: 16/899,656

(22) Filed: Jun. 12, 2020

(65) Prior Publication Data
US 2021/0024027 A1 Jan. 28, 2021

(30) Foreign Application Priority Data

Jul. 22, 2019 (JP) .............. JP2019-134725

(51) Int. Cl.
*B60R 21/233* (2006.01)
*B60R 21/0134* (2006.01)
*B60R 21/015* (2006.01)
*B60R 21/239* (2006.01)
*B60R 21/205* (2011.01)
(Continued)

(52) U.S. Cl.
CPC ........ *B60R 21/233* (2013.01); *B60R 21/0134* (2013.01); *B60R 21/01552* (2014.10); *B60R 21/239* (2013.01); *B60R 21/205* (2013.01); *B60R 21/214* (2013.01);
(Continued)

(58) Field of Classification Search
CPC .............. B60R 21/233; B60R 21/0134; B60R 21/01552; B60R 21/239; B60R 21/205; B60R 2021/0041; B60R 2021/23107; B60R 21/214; B60R 2021/01013; B60R 21/231; B60R 2021/01211
See application file for complete search history.

(56) References Cited

U.S. PATENT DOCUMENTS 10,836,337 B2 * 11/2020 Shin ................ B60R 21/214
2019/0023214 A1 * 1/2019 Kitagawa .......... B60R 21/01552
(Continued)

FOREIGN PATENT DOCUMENTS

CN 112440923 A * 3/2021
DE 10154694 A1 * 5/2003 ........... B60R 21/231
(Continued)

*Primary Examiner* — Drew J Brown
(74) *Attorney, Agent, or Firm* — Smith, Gambrell & Russell, LLP

(57) ABSTRACT

An occupant protection device for a vehicle includes a collision predictor, a main airbag, an occupant state detecting device, a sub-airbag, and a deployment controller. The collision predictor is configured to predict a collision of the vehicle. The main airbag is configured to deploy toward an occupant from a front of the vehicle when the collision predictor predicts a collision of the vehicle. The occupant state detecting device is configured to detect a position of an arm of the occupant. The sub-airbag is configured to deploy toward the arm of the occupant and to swiftly deflate after deployment. The deployment controller is configured to, when the collision predictor predicts a collision of the vehicle, cause the sub-airbag to deploy toward the arm of the occupant detected by the occupant state detecting device and cause the main airbag to deploy after deflation of the sub-airbag.

9 Claims, 6 Drawing Sheets

(51) Int. Cl.
  *B60R 21/00* (2006.01)
  *B60R 21/231* (2011.01)
  *B60R 21/214* (2011.01)
  *B60R 21/01* (2006.01)

(52) U.S. Cl.
  CPC .............. *B60R 2021/0041* (2013.01); *B60R 2021/01013* (2013.01); *B60R 2021/23107* (2013.01)

(56) References Cited

U.S. PATENT DOCUMENTS

2019/0135220 A1* 5/2019 Rupp .................... B60R 21/237
2019/0299912 A1* 10/2019 Tanaka .................. B60R 21/233
2021/0024028 A1* 1/2021 Kanegae ............. B60R 21/0134

FOREIGN PATENT DOCUMENTS

DE   102018117714 A1 * 1/2020 ........... B60R 21/205
JP   2018-052441 A    4/2018

\* cited by examiner

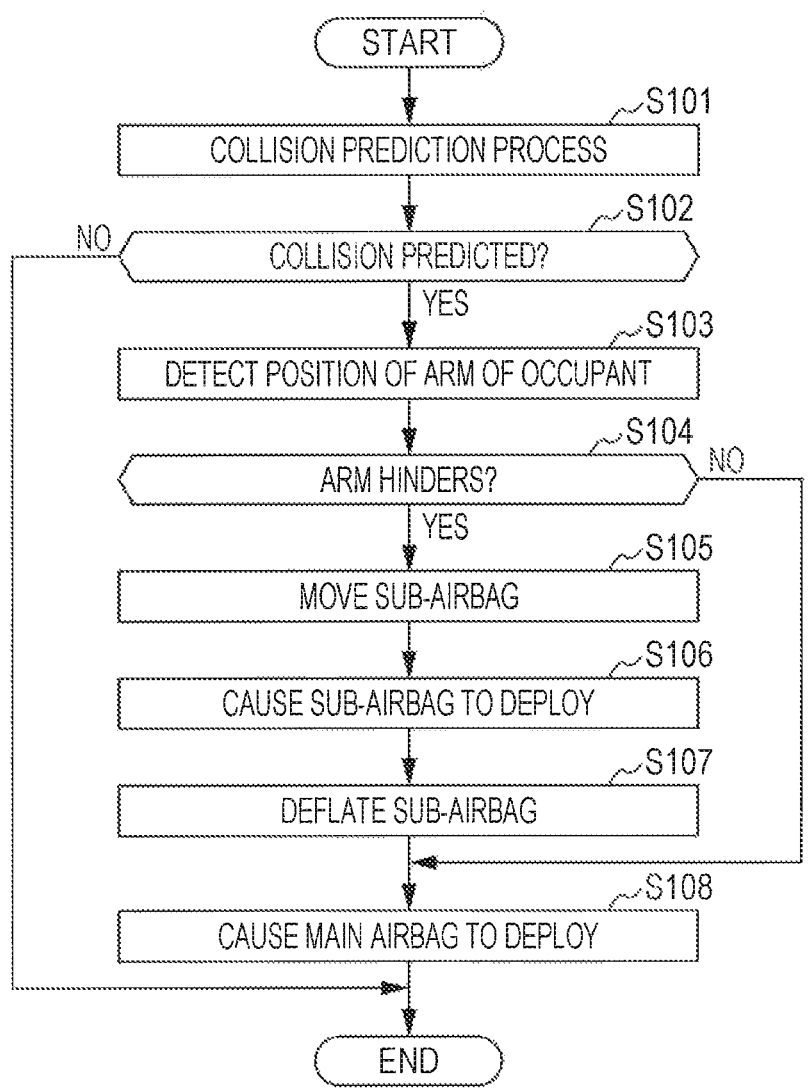

OCCUPANT PROTECTION DEVICE

CROSS-REFERENCE TO RELATED APPLICATIONS

The present application claims priority from Japanese Patent Application No. 2019-134725 filed on Jul. 22, 2019, the entire contents of which are hereby incorporated by reference.

BACKGROUND

The disclosure relates to an occupant protection device.

To protect an occupant from a collision and so on, a vehicle, such as an automobile, is provided with an airbag device as an occupant protection device.

The airbag device is typically constituted by an impact sensor, an inflator, an airbag, a control device, and so on. In the airbag device, when the impact sensor detects the impact of, for example, a front collision, the impact sensor outputs a detection signal to the control device, the control device sends an activation signal to the inflator, and the inflator generates gas and sends the gas to the airbag. The airbag is instantaneously inflated with the gas sent from the inflator and deploys in front of the occupant. Accordingly, the airbag holds the body of the occupant moving forward due to the impact with the gas pressure inside thereof and deflates while absorbing the kinetic energy. Consequently, abrupt forward movement of the occupant caused by the impact exerted by, for example, the front collision of the automobile is slowed by the airbag, and the safety of the occupant is ensured.

Currently, autonomous driving technology is being studied. In a vehicle employing such autonomous driving, the travel state of the vehicle is controlled regardless of the intention of an occupant, such as the driver. Accordingly, an occupant protection device for such an autonomous driving vehicle is being proposed. This vehicle occupant protection device includes a front airbag that deploys in front of the upper body of the occupant. The front airbag has a shoulder-rest recess in a part with which the shoulder in the upper body of the occupant moving forward from the seating position comes into contact so that the shoulder fits in the shoulder-rest recess. Accordingly, even if the upper body of the occupant sitting in the seat moves forward from the seating position before a collision during autonomous driving of the vehicle, the shoulder in the upper body is supported by the shoulder-rest recess so as to protect the occupant. In the vehicle occupant protection device, the front airbag has an inclined surface that extends from the shoulder-rest recess toward one side in the vehicle width direction such that the inclined surface on the one side is located backward relative to the inclined surface on the other side. Accordingly, the entire upper body that moves forward in a posture in which the shoulder on the other side is located forward relative to the shoulder on the one side can be held and supported by the inclined surface of the front airbag, the entire upper body can be supported in a stable state, and the impact can be absorbed in the stable state (see Japanese Unexamined Patent Application Publication. No. 2018-052441).

SUMMARY

An aspect of the disclosure provides an occupant protection device for a vehicle. The occupant protection device includes a collision predictor, a main airbag, an occupant state detecting device, a sub-airbag, and a deployment controller. The collision predictor is configured to predict a collision of the vehicle. The main airbag is configured to deploy toward an occupant from a front of the vehicle when the collision predictor predicts a collision of the vehicle. The occupant state detecting device is configured to detect a position of an arm of the occupant. The sub-airbag is configured to deploy toward the arm of the occupant and to swiftly deflate after deployment. The deployment controller is configured to, when the collision predictor predicts a collision of the vehicle, cause the sub-airbag to deploy toward the arm of the occupant detected by the occupant state detecting device and cause the main airbag to deploy after deflation of the sub-airbag.

An aspect of the disclosure provides an occupant protection device for a vehicle. The occupant protection device includes a main airbag, an occupant state detecting device, a sub-airbag, and circuitry. The main airbag is configured to deploy toward an occupant from a front of the vehicle when a collision of the vehicle is predicted. The occupant state detecting device is configured to detect a position of an arm of the occupant. The sub-airbag is configured to deploy toward the arm of the occupant and to swiftly deflate after deployment. The circuitry is configured to predict a collision of the vehicle. When a collision of the vehicle is predicted, the circuitry is configured to cause the sub-airbag to deploy toward the arm of the occupant detected by the occupant state detecting device and cause the main airbag to deploy after deflation of the sub-airbag.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 5 is a flowchart illustrating overall operations of the occupant protection device.

DETAILED DESCRIPTION

With the widespread and full-scale use of autonomous driving, the riding state of an occupant becomes more flexible. Accordingly, for example, even when the occupant is sitting in the driver's seat, the occupant may be holding a portable terminal or the like in their hand during traveling of the vehicle. Currently, an occupant sitting in a seat other than the driver's seat may be holding a portable terminal or the like in their hand during traveling of the vehicle.

In a case where an occupant is holding a portable terminal or the like when the front airbag deploys toward the occupant, for example, the arm of the occupant is sandwiched between the front airbag and the upper body of the occupant, and it is difficult to provide optimum occupant protection. The present applicant has devised a technique in which, in a case where an occupant is holding a portable terminal or the like, an arm-pushing sub-airbag is used to push the arm of the occupant away before deployment of the front airbag. However, in a case where this technique is used, deployment of the front airbag may be hindered unless the sub-airbag is treated appropriately after pushing the arm away.

Accordingly, it is desirable to provide an occupant protection device that can provide optimum occupant protection even in a case where an occupant is holding a portable terminal or the like.

Hereinafter, embodiments of the disclosure will be described with reference to the drawings.

First Embodiment

Figure 1:
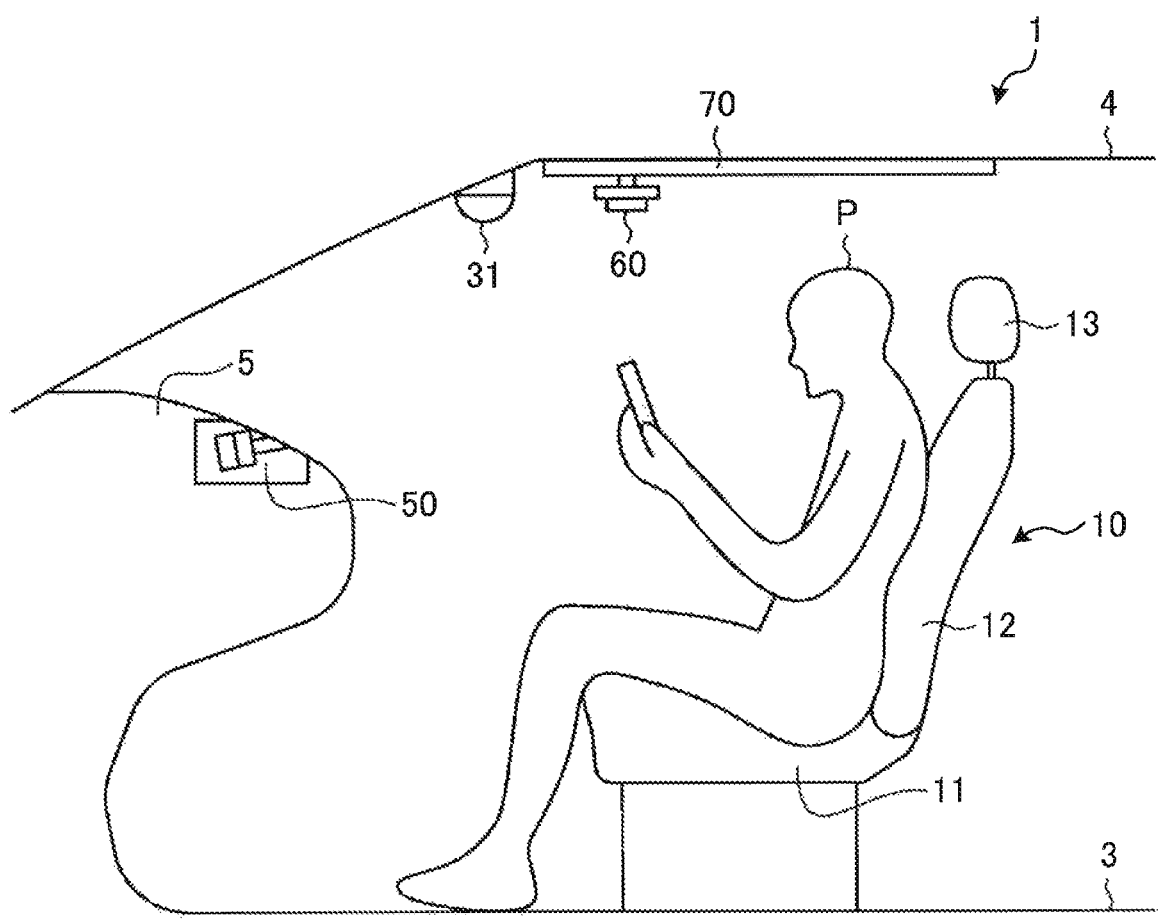
FIG. 1 is a cross-sectional view and illustrates part of a vehicle provided with an occupant protection device according to an embodiment of the disclosure.
Figure 2:
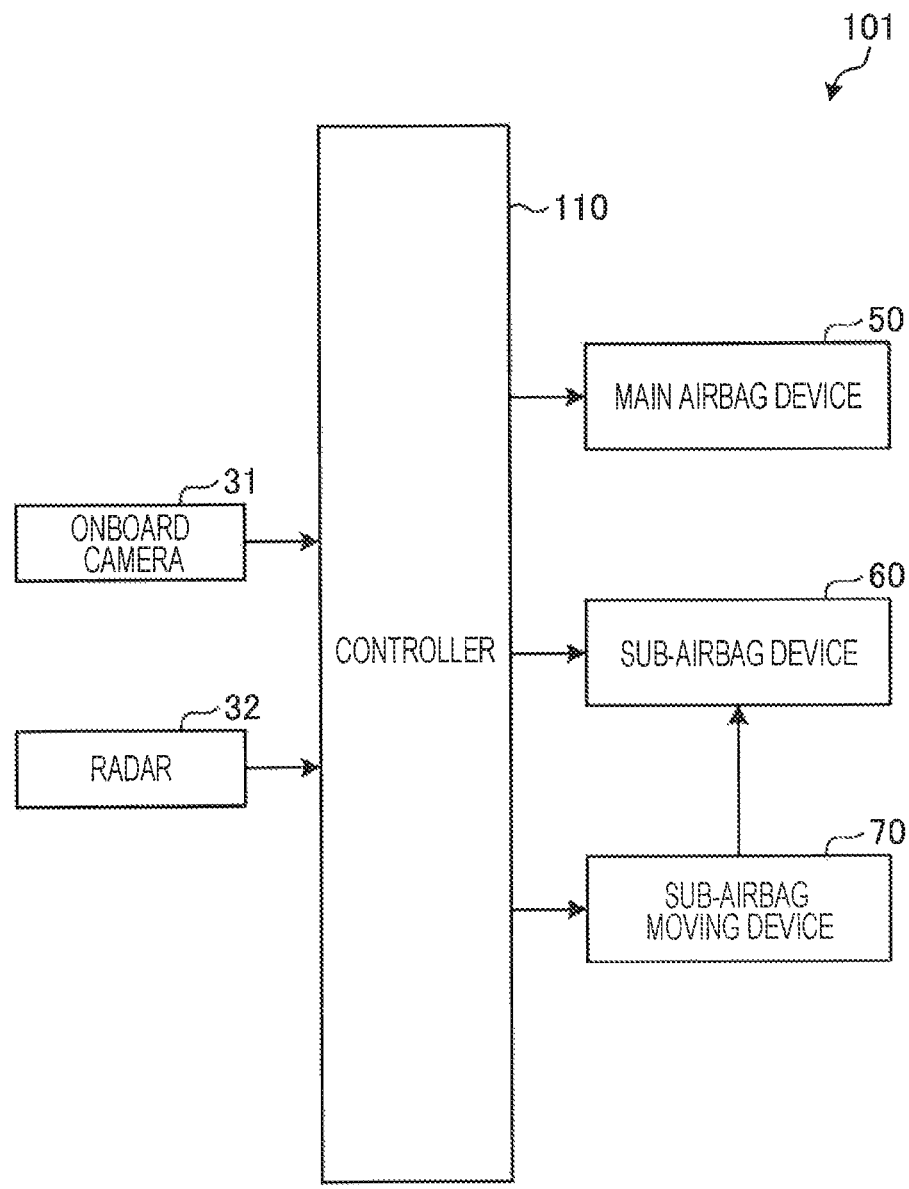
FIG. 2 is a schematic block diagram of the occupant protection device according to the embodiment of the disclosure.
Figure 3A:
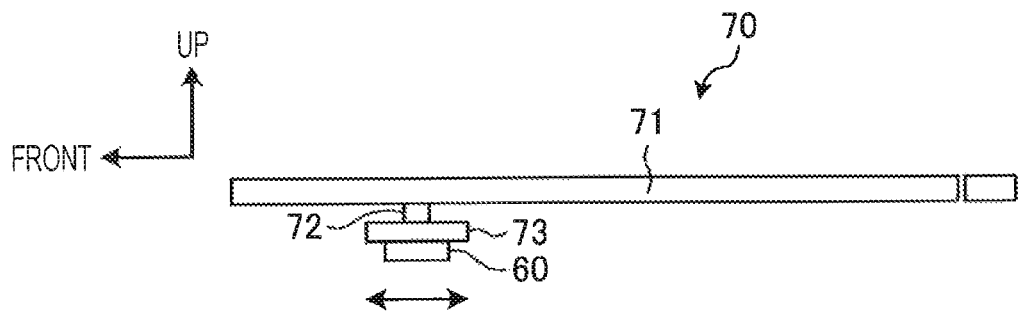
FIG. 3A and FIG. 3B are diagrams schematically illustrating a sub-airbag moving device.
Figure 3B:
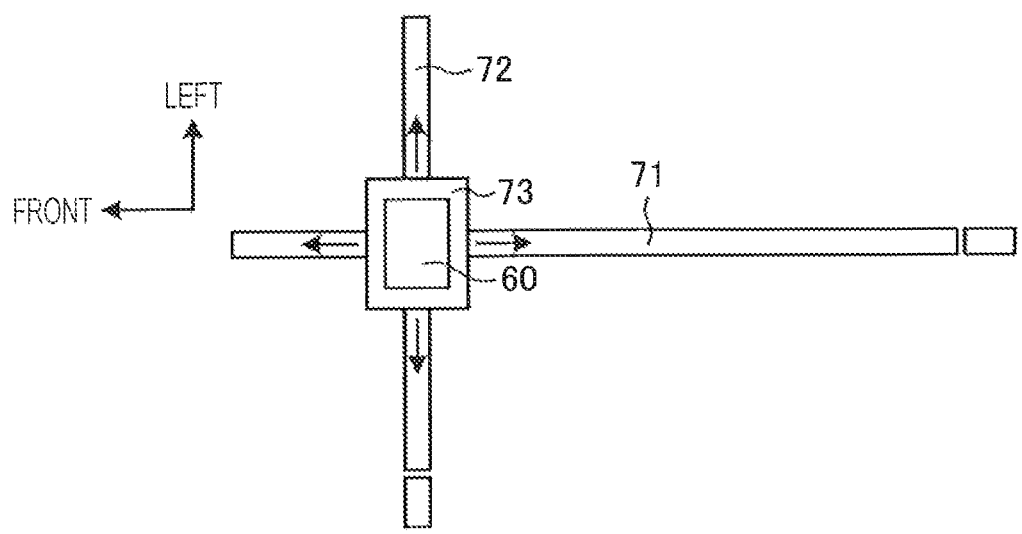
Figure 4A:
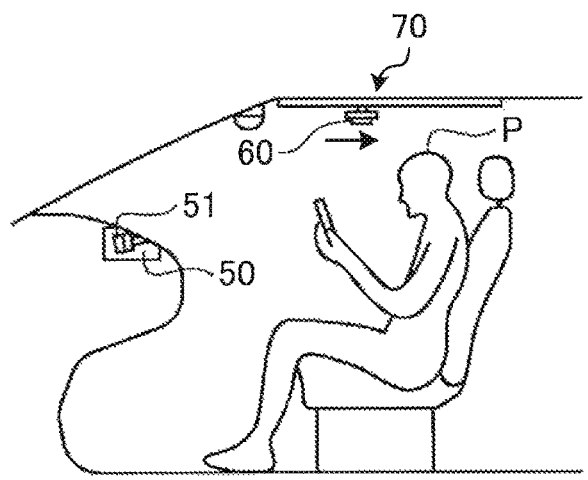
FIG. 4A to FIG. 4E are side views and illustrate the course of deployment of airbag bodies.
Figure 4D:
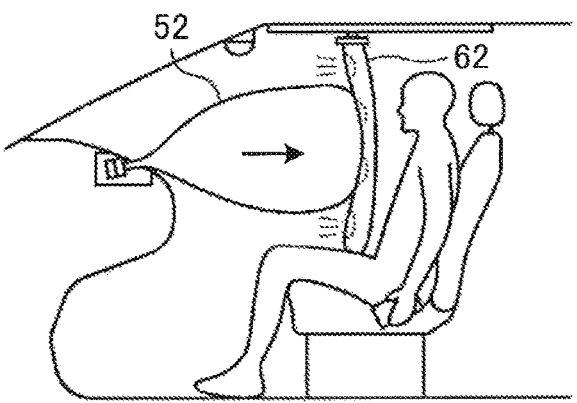
Figure 4B:
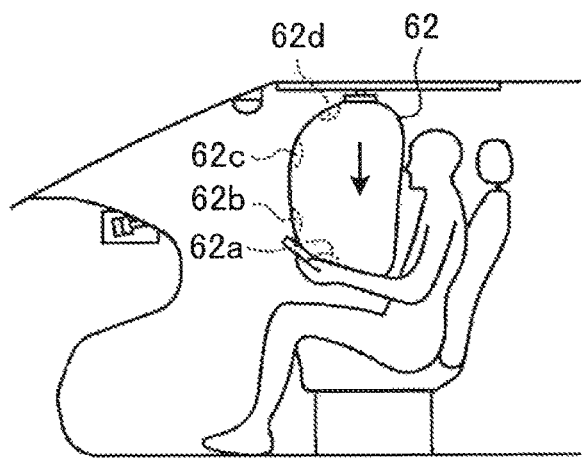
Figure 4E:
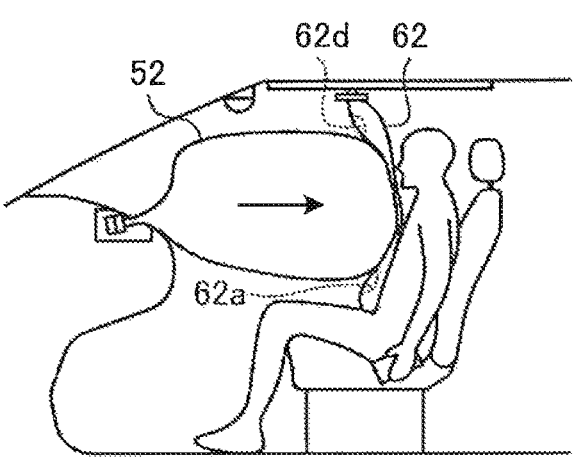
Figure 4C:
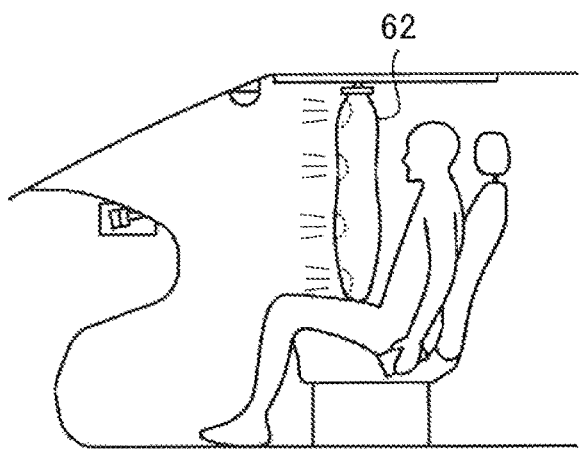

FIG. 1 is a cross-sectional view and illustrates part of a vehicle provided with an occupant protection device according to an embodiment of the disclosure. FIG. 2 is a schematic block diagram of the occupant protection device according to the embodiment of the disclosure. FIG. 3A and FIG. 3B are diagrams schematically illustrating a sub-airbag moving device that moves a sub-airbag device according to the embodiment. FIG. 4A to FIG. 4E are side views and illustrate the course of deployment of airbag bodies when the occupant protection device according to the embodiment is activated. FIG. 5 is a flowchart illustrating overall operations of the occupant protection device.

Configuration of Vehicle 1

As illustrated in FIG. 1, in the occupant compartment of a vehicle 1, a floor 3 is provided in the lower part and a roof 4 is provided in the upper part. On the floor 3, a seat 10 is disposed. The vehicle 1 is further provided with an occupant protection device 101 described below.

The seat 10 is a seat for an occupant P to be seated while the occupant P is riding in the vehicle 1. The seat 10 includes a seat cushion 11 (seat) that supports the buttocks to the femoral region of the occupant P, a seatback 12 (backrest) that is provided so as to be reclinable, and a headrest 13 (head part) that supports the head of the occupant P.

Configuration of Occupant Protection Device 101

As illustrated in FIG. 2, the occupant protection device 101 includes an onboard camera 31, a radar 32, a main airbag device 50, a sub-airbag device 60, a sub-airbag moving device 70, and a controller 110. The main airbag device 50 is provided in a dashboard 5. The sub-airbag device 60 is provided on the sub-airbag moving device 70 provided on the roof 4.

As described below, the controller 110 has functions of an airbag deployment control unit (also called "airbag control unit (ACU)") that detects a collision or collision prediction of the vehicle 1 on the basis of information input from the onboard camera 31 and the radar 32 and controls deployment of an airbag body provided in the main airbag device 50 and that provided in the sub-airbag device 60. The controller 110 may be provided as part of a vehicle control device (hereinafter referred to as "electronic control unit (ECU)") that controls the vehicle 1 as a whole.

Onboard Camera 31

The onboard camera 31 is capable of capturing images of scenes outside and inside the vehicle 1. For example, the onboard camera 31 captures images of the environment around the vehicle 1, such as scenes ahead of, behind, and on the sides of the vehicle 1. The onboard camera 31 captures an image of the inside of the vehicle so that the seating state of the occupant P sitting in the seat 10, such as the position of the arm or hand of the occupant P, is known. Image information about the captured image is input to the controller 110, recorded to a random access memory (RAM) of the controller 110, and analyzed by the controller 110. Accordingly, the controller 110 can recognize the situation around the vehicle 1 (the situation outside the vehicle) in real time or in a follow-up manner. The controller 110 can recognize the situation inside the vehicle, such as the state of the occupant P, in real time or in a follow-up manner. As an example of the state of the occupant P, the position of the arm or hand of the occupant P is assumed.

Radar 32

The radar 32 emits a radio wave to detect an object, such as an obstacle, and measure the distance to and the direction of the object. The radar 32 is installed on the front bumper or the rear bumper of the vehicle 1 so as to enable, for example, front monitoring, rear monitoring, and side monitoring for the vehicle 1. Monitoring information is input to the controller 110, recorded to the RAM of the controller 110, and analyzed by the controller 110. Accordingly, the controller 110 can recognize the situation around the vehicle 1 in real time or in a follow-up manner.

In this embodiment, the onboard camera 31 and the radar 32 are provided, and information from both the onboard camera 31 and the radar 32 is used to predict a collision; however, this embodiment is not limited to this, and only one of the onboard camera 31 or the radar 32 may be used or another device may be used. In this embodiment, the situation inside the vehicle, that is, information about the state of the occupant P, is obtained by using image information obtained by the onboard camera 31; however, this embodiment is not limited to this, and a human detecting sensor or the like may be used.

Main Airbag Device 50

The main airbag device 50 is controlled by the controller 110 to protect the occupant P from the impact of a collision. The main airbag device 50 includes a main inflator 51 and a main airbag body 52 (see, for example, FIG. 4A and FIG. 4D).

Main Inflator 51

The main inflator 51 ignites gunpowder in response to an activation signal based on collision detection or collision prediction of the vehicle 1 by the controller 110 to generate gas from a chemical reaction caused by burning. The gas generated by the main inflator 51 is injected into the main airbag body 52. The main inflator 51 receives the activation signal from the controller 110 later than a sub-inflator described below does.

Main Airbag Body 52

The main airbag body 52 is a bag body into which gas is injected by the main inflator 51. The main airbag body 52 is folded up small when not activated. When gas is injected from the main inflator 51, the main airbag body 52 inflates and deploys from the dashboard 5 toward the seat 10 to reduce the impact of the collision of the vehicle 1 on the head, chest, and so on of the occupant P. That is, when a collision of the vehicle 1 is predicted by the controller 110, the main airbag body 52 deploys from the front of the vehicle 1 toward the occupant P.

Sub-Airbag Device 60

The sub-airbag device 60 is controlled by the controller 110 to move the arm or hand of the occupant P from the deployment area of the main airbag body 52 to the outside of the deployment area. The sub-airbag device 60 is moved to a predetermined position by the sub-airbag moving device

70. The sub-airbag device 60 includes a sub-inflator (not illustrated) and a sub-airbag body 62.

The deployment area of the main airbag body 52 is an area between the dashboard 5 and for example, the upper body of the occupant P, and the area is occupied by the main airbag body 52 at the time of deployment.

Sub-Inflator

The sub-inflator ignites gunpowder in response to an activation signal based on collision detection or collision prediction of the vehicle 1 by the controller 110 to generate gas from a chemical reaction caused by burning. The gas generated by the sub-inflator is injected into the sub-airbag body 62. The sub-inflator receives the activation signal from the controller 110 earlier than the main inflator 51 does.

Sub-Airbag Body 62

The sub-airbag body 62 is a bag body into which gas is injected by the sub-inflator. The sub-airbag body 62 is folded up small when not activated. When gas is injected from the sub-inflator, the sub-airbag body 62 inflates and deploys downward from the predetermined position to which the sub-airbag device 60 is moved by the sub-airbag moving device 70 to move the arm or hand of the occupant P outside the deployment area of the main airbag body 52. That is, the sub-airbag body 62 deploys downward from above the occupant P.

The sub-airbag body 62 has a plurality of vent holes 62*a*, 62*b*, 62*c*, and 62*d* for discharging gas inside thereof. The vent holes 62*a*, 62*b*, 62*c*, and 62*d* are larger than a vent hole of a usual airbag. Therefore, at the time of inflation and deployment, a large amount of gas is discharged through the vent holes 62*a*, 62*b*, 62*c*, and 62*d* so that the sub-airbag body 62 swiftly deflates after deployment. The vent hole 62*a* is provided at the distal end of the sub-airbag body 62, that is, the lowest position at the time of deployment, the vent hole 62*b* is provided second from the lowest position, the vent hole 62*c* is provided third from the lowest position, and the vent hole 62*d* is provided at the highest position.

The vent holes 62*a*, 62*b*, 62*c*, and 62*d* are provided on a side of the sub-airbag body 62 facing the front of the vehicle 1 when the sub-airbag body 62 deploys. That is, the vent holes 62*a*, 62*b*, 62*c*, and 62*d* are provided on a side of the sub-airbag body 62 opposite the occupant P when the sub-airbag body 62 deploys. Therefore, hot and high-pressure gas discharged through the vent holes 62*a*, 62*b*, 62*c*, and 62*d* of the sub-airbag body 62 is not directed to the occupant P, which enables favorable occupant protection.

The vent holes 62*a* and 62*d* of the sub-airbag body 62 are located at positions at which the main airbag body 52 does not come into contact with the sub-airbag body 62 even when the main airbag body 52 deploys. On the other hand, part of the sub-airbag body 62 is pressed by the main airbag body 52 when the main airbag body 52 deploys. Therefore, even if the sub-airbag body 62 does not completely deflate when the main airbag body 52 deploys, the sub-airbag body 62 is pressed by the main airbag body 52, gas is discharged through the vent holes 62*a* and 62*d*, and the sub-airbag body 62 fully deflates.

Sub-Airbag Moving Device 70

The sub-airbag moving device 70 is installed on the roof 4, is controlled by the controller 110, and moves the sub-airbag device 60 in the front-back and right-left directions of the vehicle 1. Therefore, as described below, the sub-airbag moving device 70 can move the deployment position of the sub-airbag body 62. The sub-airbag moving device 70 includes a front-back rail 71, a right-left rail 72, and a moving stage 73 (see FIG. 3A and FIG. 3B).

Front-Back Rail 71

The front-back rail 71 is provided on the lower part of the roof 4 so as to extend in the front-back direction of the vehicle 1 (hereinafter simply referred to as "front-back direction"). The front-back rail 71 holds the right-left rail 72 on the lower part thereof so as to allow the right-left rail 72 to slide in the front-back direction. The front-back rail 71 is controlled by the controller 110 to move the right-left rail 72 forward and backward in the direction in which the front-back rail 71 extends.

Right-Left Rail 72

The right-left rail 72 is held by the front-back rail 71 on the upper part thereof and is provided so as to extend in the right-left direction of the vehicle 1 (hereinafter simply referred to as "right-left direction"). The right-left rail 72 holds the moving stage 73 on the lower part thereof so as to allow the moving stage 73 to slide in the right-left direction. The right-left rail 72 is controlled by the controller 110 to move the moving stage 73 rightward and leftward in the direction in which the right-left rail 72 extends.

Moving Stage 73

The moving stage 73 is held by the right-left rail 72 on the upper part thereof, and the sub-airbag device 60 is installed on the lower part of the moving stage 73. Therefore, the moving stage 73 can move in the front-back direction along the front-back rail 71 and can move in the right-left direction along the right-left rail 72 together with the sub-airbag device 60.

That is, the sub-airbag device 60 is moved by the sub-airbag moving device 70 in the front-back and right-left directions of the vehicle 1 in accordance with control by the controller 110 to change the deployment position of the sub-airbag body 62 as desired.

Controller 110

The controller 110 controls operations of the occupant protection device 101. The controller 110 includes a central processing unit (CPU), a read-only memory (ROM) that stores a control program executed by the CPU, a data table, commands, data, and so on, the RAM that temporarily stores data, an electrically erasable and programmable read-only memory (EEPROM) formed of a rewritable non-volatile memory, and an input-output interface circuit. The controller 110 centrally controls the occupant protection device 101.

The controller 110 is coupled to the onboard camera 31, the radar 32, the main airbag device 50, the sub-airbag device 60, the sub-airbag moving device 70, and the ECU not illustrated via the input-output interface circuit.

The controller 110 performs collision prediction and collision determination for the vehicle 1 on the basis of information received from the onboard camera 31 and the radar 32.

An acceleration sensor (G sensor), a distance sensor, an impact sensor (pressure sensor), and the like may be used, and the controller 110 may perform collision prediction and collision determination on the basis of information received from these devices instead of the information received from the onboard camera 31 and the radar 32.

The controller 110 identifies the state of the occupant P, such as the position of the arm of the occupant P, on the basis of the information input from the onboard camera 31. The controller 110 activates the sub-airbag moving device 70 to move the deployment position of the sub-airbag body 62. The controller 110 controls the sub-airbag device 60 to cause the sub-airbag body 62 to deploy. The controller 110 controls the main airbag device 50 to cause the main airbag body 52 to deploy.

When predicting a collision of the vehicle 1, the controller 110 activates the sub-airbag moving device 70 to move the sub-airbag body 62 to a position above the position of the arm of the occupant P, causes the sub-airbag body 62 to deploy, and thereafter, causes the main airbag body 52 to deploy.

Operations of Occupant Protection Device 101

Now, operations of the occupant protection device 101 thus configured are described.

FIG. 4A to FIG. 4E are side views and illustrate the course of deployment of airbag bodies (main airbag body 52 and sub-airbag body 62). FIG. 5 is a flowchart illustrating overall operations of the occupant protection device 101.

In the occupant protection device 101, a control process illustrated in FIG. 5 is regularly performed by the controller 110 at predetermined intervals.

In the control process, the controller 110 first performs a collision prediction process (step S101). For example, the controller 110 predicts a collision of the vehicle 1 on the basis of information input from the onboard camera 31 and the radar 32. In addition to this collision prediction, the controller 110 also performs a collision determination process for the vehicle 1. In a case where the controller 110 detects a collision of the vehicle 1, the controller 110 may perform a process similar to a process described below that is performed at the time when a collision is predicted; however, it is desirable to perform a process that is performed at the time of a collision. In the process that is performed at the time of a collision, for example, the controller 110 causes only the main airbag body 52 to deploy without causing the sub-airbag body 62 to deploy.

Next, the controller 110 determines whether collision prediction of the vehicle 1 is detected (step S102). That is, the controller 110 determines whether a collision of the vehicle 1 is predicted in the collision prediction process.

In a case where the controller 110 determines that a collision is predicted (YES in step S102), the flow proceeds to step S103. In a case where the controller 110 determines that no collision is predicted (NO in step S102), the control process ends.

When detecting collision prediction of the vehicle 1, the controller 110 detects the position of the arm of the occupant P (step S103). For example, the controller 110 detects the position of the arm of the occupant P sitting in the seat 10 on the basis of information input from the onboard camera 31.

Next, the controller 110 determines whether the arm of the occupant P is in the deployment area of the main airbag body 52 (step S104). For example, the controller 110 determines whether the position of the arm of the occupant P detected as described above is between the main airbag body 52 and the upper body of the occupant P. That is, the controller 110 determines whether the arm of the occupant P is sandwiched between the main airbag body 52 and the upper body of the occupant P when causing the main airbag body 52 to deploy.

In a case where the controller 110 determines that the arm of the occupant P is in the deployment area of the main airbag body 52 (YES in step S104), the flow proceeds to step S105. In a case where the controller 110 determines that the arm of the occupant P is not in the deployment area of the main airbag body 52 (NO in step S104), the flow proceeds to step S108.

In the case where the controller 110 determines that the arm of the occupant P is in the deployment area of the main airbag body 52, the controller 110 moves the deployment position of the sub-airbag body 62 (step S105). For example, on the basis of the position of the arm of the occupant P, the controller 110 controls the sub-airbag moving device 70 to move the position of the sub-airbag device 60. In details, on the basis of the position of the arm of the occupant P detected as described above, the controller 110 moves the right-left rail 72 of the sub-airbag moving device 70 in the front-back direction along the front-back rail 71 to a position above the position of the arm of the occupant P. The controller 110 moves the moving stage 73 of the sub-airbag moving device 70 in the right-left direction along the right-left rail 72 to the position above the position of the arm of the occupant P. Accordingly, the sub-airbag device 60 can be moved to the position above the occupant P before the sub-airbag body 62 deploys.

Next, the controller 110 performs a process for causing the sub-airbag body 62 to deploy (step S106). For example, the controller 110 transmits an activation signal to the sub-inflator of the sub-airbag device 60 moved as described above to cause ignition to occur and to generate gas. In the sub-airbag device 60, when the sub-inflator generates gas, the gas is injected into the sub-airbag body 62, and the sub-airbag body 62 deploys downward toward the arm of the occupant P. Accordingly, the arm of the occupant P is pushed away by the deploying sub-airbag body 62, and the arm of the occupant P is removed from the deployment area of the main airbag body 52.

In the case where the arm of the occupant P is not in the deployment area of the main airbag body 52 as described above (NO in step S104), the process in step S105, step S106, and step S107 is skipped. Therefore, the sub-airbag body 62 deploys only in the case where the position of the arm of the occupant P is between the main airbag body 52 and the upper body of the occupant P.

Next, the controller 110 performs a process for deflating the sub-airbag body 62 (step S107). For example, the controller 110 waits for a predetermined time to pass and causes the gas to be discharged through the vent holes 62a, 62b, 62c, and 62d of the sub-airbag body 62.

In this embodiment, the sub-airbag body 62 is deflated by discharge of the gas through the vent holes 62a, 62b, 62c, and 62d; however, the gas may be forcibly discharged. For example, a suction device may be added to the sub-airbag device 60 to suck and discharge the gas from the sub-airbag body 62 after deployment of the sub-airbag body 62.

Next, the controller 110 performs a process for causing the main airbag body 52 to deploy (step S108). For example, the controller 110 transmits an activation signal to the main inflator 51 of the main airbag device 50 to cause ignition to occur and to generate gas. In the main airbag device 50, when the main inflator 51 generates gas, the gas is injected into the main airbag body 52, and the main airbag body 52 deploys backward toward the upper body of the occupant P. That is, the controller 110 causes the main airbag body 52 to deploy after deflation of the sub-airbag body 62.

As described above, the occupant protection device 101 according to this embodiment pushes the arm of the occupant P away by the sub-airbag body 62, deflates the sub-airbag body 62 that has pushed the arm away, and thereafter, causes the main airbag body 52 to deploy toward the upper body of the occupant P, thereby optimally protecting the occupant P. That is, even in a case where the occupant P is holding a portable terminal or the like, their arm is removed from the deployment area of the main airbag body 52 by the sub-airbag body 62, and the sub-airbag body 62 does not hinder the main airbag body 52 from deploying. Therefore, the main airbag body 52 precisely deploys toward the occupant P without the arm of the occupant P being pressed against their upper body by the main airbag body 52, and the occupant P can be appropriately protected.

Second Embodiment

Now, an example of the occupant protection device 101 in which the sub-airbag device 60 and the sub-airbag moving device 70 are accommodated in the roof 4 is described.

The occupant protection device 101 according to the second embodiment is similar to the occupant protection device 101 according to the first embodiment except the position where the sub-airbag device 60 and the sub-airbag moving device 70 are disposed. In the following description, an element corresponding to that in the first embodiment is assigned the same reference numeral as in the first embodiment, and a description thereof is omitted.

Figure 6A:
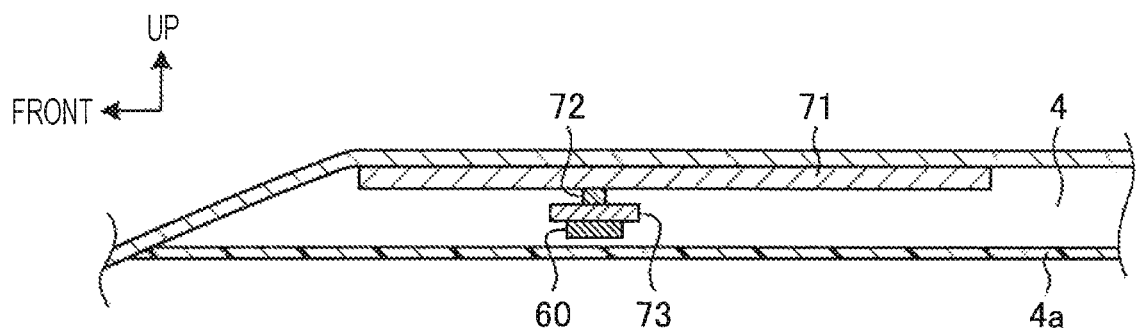
FIG. 6A and FIG. 6B are cross-sectional views and illustrate an accommodation form of the sub-airbag moving device.
Figure 6B:
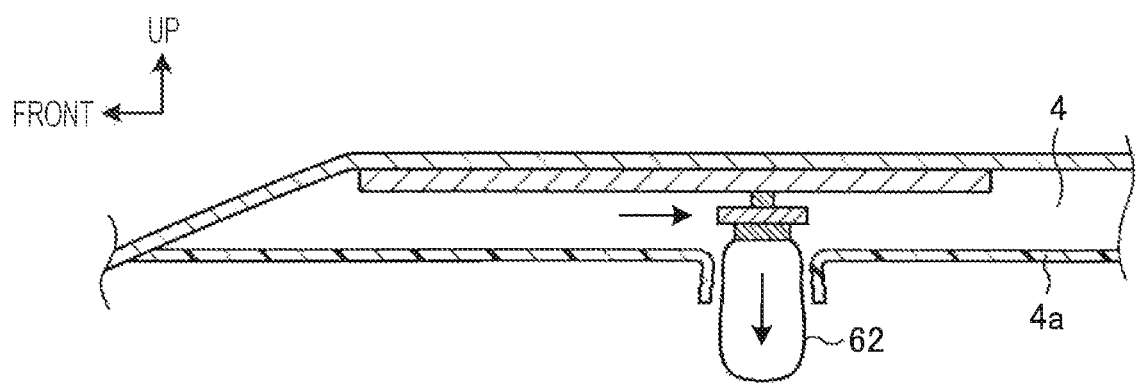

FIG. 6A and FIG. 6B are cross-sectional views and illustrate an accommodation form of the sub-airbag moving device 70 according to the second embodiment. FIG. 6A is a cross-sectional view of the sub-airbag moving device 70 before deployment of the sub-airbag body 62, and FIG. 6B is a cross-sectional view of the sub-airbag moving device 70 after deployment of the sub-airbag body 62.

As illustrated in FIG. 6A and FIG. 6B, a roof trim 4a is provided in the lower part of the roof 4. The roof 4 has a hollow internal space between an external wall in the upper part and the roof trim 4a in the lower part.

The sub-airbag device 60 and the sub-airbag moving device 70 are provided in the roof 4. The front-back rail 71 of the sub-airbag moving device 70 is installed on the upper surface in the roof 4. The right-left rail 72 moves forward and backward in the roof 4 along the front-back rail 71. The moving stage 73 and the sub-airbag device 60 move rightward and leftward in the roof 4 along the right-left rail 72.

The sub-airbag device 60 is controlled by the controller 110, the deployment position of the sub-airbag body 62 is moved by the sub-airbag moving device 70, and the sub-airbag device 60 causes the sub-airbag body 62 to deploy. When the sub-airbag body 62 inflates and deploys in the roof 4, the sub-airbag body 62 breaks through the roof trim 4a immediately below thereof and deploys toward the arm of the occupant P.

The roof trim 4a is fragile to a certain degree so as to be broken by the force of deployment of the sub-airbag body 62. The roof trim 4a may be fragile only in a part immediately below an area in which the sub-airbag device 60 moves.

As described above, in the occupant protection device 101 according to this embodiment, the sub-airbag device 60 and the sub-airbag moving device 70 are usually accommodated in the roof 4 (before deployment of the sub-airbag body 62). Therefore, the sub-airbag device 60 and the sub-airbag moving device 70 are covered and not seen by the occupant P. Accordingly, occupant protection can be provided without spoiling the appearance.

In the occupant protection device 101 according to the embodiments, the sub-airbag moving device 70 moves the sub-airbag device 60 in the front-back and right-left directions; however, the occupant protection device 101 is not limited to this. The occupant protection device 101 may cause deployment toward the arm of the occupant P from a predetermined position to occur by changing the deployment direction.

For example, the sub-airbag moving device 70 may move the sub-airbag device 60 only in the front-back direction and rotate the sub-airbag device 60 so as to face the arm of the occupant P instead of moving the sub-airbag device 60 in the right-left direction, and thereafter, the sub-airbag device 60 may cause the sub-airbag body 62 to deploy. The sub-airbag moving device 70 may move the sub-airbag device 60 only in the right-left direction and rotate the sub-airbag device 60 so as to face the arm of the occupant P instead of moving the sub-airbag device 60 in the front-back direction, and thereafter, the sub-airbag device 60 may cause the sub-airbag body 62 to deploy.

Alternatively, the sub-airbag moving device 70 may rotate the sub-airbag moving device 70 so as to face the arm of the occupant P without moving the sub-airbag device 60 in the front-back direction or the right-left direction, and thereafter, the sub-airbag device 60 may cause the sub-airbag body 62 to deploy.

The occupant protection device 101 according to the embodiments includes one sub-airbag device 60; however, the occupant protection device 101 may include a plurality of sub-airbag devices 60.

For example, two sub-airbag devices 60, one of which is for the right arm and the other is for the left arm, may be provided, and the sub-airbag devices 60 may cause their respective sub-airbag bodies 62 to deploy in accordance with the situation. Alternatively, a plurality of sub-airbag devices 60 may be provided in the front-back direction.

Further, the width of the sub-airbag body 62 may be increased so as to limit the moving area of the sub-airbag device 60. For example, when the length (width) of the sub-airbag body 62 in the front-back direction is increased, the position of the arm of the occupant P can be covered without moving the sub-airbag device 60 forward and backward over a large distance, and the sub-airbag body 62 can easily push the arm of the occupant P away.

As described above, in the embodiments, the sub-airbag body 62 is deflated by discharge of gas through the vent holes 62a, 62b, 62c, and 62d; however, the gas may be forcibly discharged.

In one embodiment, the onboard camera 31 may serve as an "occupant state detecting device". In one embodiment, the controller 110 may serve as a "collision predictor" and a "deployment controller".

In one embodiment, the main airbag body 52 may serve as a "main airbag". In one embodiment, the sub-airbag body 62 may serve as a "sub-airbag".

According to embodiments of the disclosure, it is possible to provide an occupant protection device that can provide optimum occupant protection even in a case where an occupant is holding a portable terminal or the like.

The controller 110 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controller 110. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An occupant protection device for a vehicle, the occupant protection device comprising:
   a collision predictor configured to predict a collision of the vehicle;
   a main airbag configured to deploy toward an occupant from a front of the vehicle when the collision predictor predicts a collision of the vehicle;
   an occupant state detecting device configured to detect a position of an arm of the occupant;
   a sub-airbag configured to deploy toward the arm of the occupant and to swiftly deflate after deployment; and
   a deployment controller configured to, when the collision predictor predicts a collision of the vehicle, cause the sub-airbag to deploy toward the arm of the occupant detected by the occupant state detecting device and cause the main airbag to deploy after deflation of the sub-airbag.

2. The occupant protection device for a vehicle according to claim 1, wherein
   the sub-airbag is disposed above the occupant at a position slightly close to the front and has a vent hole for deflation at a position on a side of the sub-airbag facing the front when deploying.

3. The occupant protection device for a vehicle according to claim 1, wherein
   when the sub-airbag is pressed by the main airbag, gas inside the sub-airbag is further discharged.

4. The occupant protection device for a vehicle according to claim 2, wherein
   when the sub-airbag is pressed by the main airbag, gas inside the sub-airbag is further discharged.

5. The occupant protection device for a vehicle according to claim 1, wherein
   the deployment controller is configured to cause the sub-airbag to deploy only in a case where the position of the arm of the occupant detected by the occupant state detecting device is between the main airbag and an upper body of the occupant.

6. The occupant protection device for a vehicle according to claim 2, wherein
   the deployment controller is configured to cause the sub-airbag to deploy only in a case where the position of the arm of the occupant detected by the occupant state detecting device is between the main airbag and an upper body of the occupant.

7. The occupant protection device for a vehicle according to claim 3, wherein
   the deployment controller is configured to cause the sub-airbag to deploy only in a case where the position of the arm of the occupant detected by the occupant state detecting device is between the main airbag and an upper body of the occupant.

8. The occupant protection device for a vehicle according to claim 4, wherein
   the deployment controller is configured to cause the sub-airbag to deploy only in a case where the position of the arm of the occupant detected by the occupant state detecting device is between the main airbag and an upper body of the occupant.

9. An occupant protection device for a vehicle, the occupant protection device comprising:
   a main airbag configured to deploy toward an occupant from a front of the vehicle when a collision of the vehicle is predicted;
   an occupant state detecting device configured to detect a position of an arm of the occupant;
   a sub-airbag configured to deploy toward the arm of the occupant and to swiftly deflate after deployment; and
   circuitry configured to
     predict a collision of the vehicle, and
     when a collision of the vehicle is predicted, cause the sub-airbag to deploy toward the arm of the occupant detected by the occupant state detecting device and cause the main airbag to deploy after deflation of the sub-airbag.

* * * * *